(12) United States Patent
Ray et al.

(10) Patent No.: US 8,484,278 B2
(45) Date of Patent: Jul. 9, 2013

(54) DIGITAL ARCHITECTURE FOR DFT/IDFT HARDWARE

(75) Inventors: Baijayanta Ray, Karnataka (IN); Venkataraghavan Punnapakkam Krishnan, Karnataka (IN); Sriram Balasubramanian, Karnataka (IN); Dalavaipatnam Rangarao Seetharaman, Karnataka (IN)

(73) Assignee: Synopsys, Inc., Mountain View, CA (US)

( * ) Notice: Subject to any disclaimer, the term of this patent is extended or adjusted under 35 U.S.C. 154(b) by 1203 days.

(21) Appl. No.: 11/801,903

(22) Filed: May 11, 2007

(65) Prior Publication Data

US 2008/0281894 A1 Nov. 13, 2008

(51) Int. Cl.
*G06F 15/00* (2006.01)

(52) U.S. Cl.
USPC .......................................................... 708/405

(58) Field of Classification Search
USPC .......................................................... 708/405
See application file for complete search history.

(56) References Cited

U.S. PATENT DOCUMENTS

| | | | | |
|---|---|---|---|---|
| 3,965,343 A * | 6/1976 | Speiser et al. | ................. | 708/405 |
| 4,601,006 A * | 7/1986 | Liu | ............... | 708/401 |
| 4,896,287 A * | 1/1990 | O'Donnell et al. | ........... | 708/622 |
| 6,085,077 A * | 7/2000 | Fields et al. | .................... | 455/303 |
| 6,098,088 A * | 8/2000 | He et al. | ......................... | 708/406 |
| 6,466,958 B1 * | 10/2002 | Van Wechel et al. | ......... | 708/422 |
| 6,611,231 B2 * | 8/2003 | Crilly et al. | .................... | 342/378 |
| 6,643,678 B2 * | 11/2003 | Van Wechel et al. | ......... | 708/530 |
| 7,020,218 B2 * | 3/2006 | Arnesen | ......................... | 375/316 |
| 2007/0266070 A1 * | 11/2007 | Sung et al. | ..................... | 708/404 |

OTHER PUBLICATIONS

Ayman M. El-Khashab and Earl E. Swartzlander, An Architecture for a Radix-4 Modular Pipeline Fast Fourier Transform, Proceedings of the Application-Specific Systems, Architectures, and Processors (ASAP'03), 2003 IEEE, pp. 1-11.*
Henrik V. Sorensen, Efficient Computation of the DFT with Only a Subset of Input or Output Points, IEEE Transactions on Signal Processing, vol. 41, No. 3, Mar. 1993, pp. 1184-1200.*
Cordic—Wikipedia, the free encyclopedia, 2011, http://en.wikipedia.org/wiki/, pp. 1-13.*
Euler's Formula—Wikipedia, the free encyclopedia, 2011, http://en.wikipedia.org/wiki/, pp. 1-13.*
Trigonometric Functions—Wikipedia, the free encyclopedia, 2011, http://en.wikipedia.org/wiki/, pp. 1-30.*

(Continued)

*Primary Examiner* — Chat Do
*Assistant Examiner* — Kevin G Hughes
(74) *Attorney, Agent, or Firm* — Park, Vaughan, Fleming & Dowler, LLP; Laxman Saharsrabuddhe (57) ABSTRACT

Embodiments of the present invention can provide circuits and systems for computing a discrete Fourier transform (DFT) or an inverse discrete Fourier transform (IDFT). An embodiment includes an input circuit, an intermediate circuit, an output circuit, and an accumulator circuit. The input circuit can receive a set of input values, and can use a first set of degenerate rotators to generate a first set of intermediate values. The intermediate circuit can receive the first set of intermediate values, and can use a set of CORDICs (coordinate rotation digital computers) to generate a second set of intermediate values. The output circuit can receive the second set of intermediate values, and can use a second set of degenerate rotators to generate a third set of intermediate values. The accumulator circuit can receive the third set of intermediate values, and can use a set of accumulators to generate a set of output values.

20 Claims, 9 Drawing Sheets

OTHER PUBLICATIONS

Wikipedia, the free encyclopedia, Capacitor—Wikipedia, the free encyclopedia, 2011, pp. 1-19.*
Wikipedia, the free encyclopedia, Resistor—Wikipedia, the free encyclopedia, 2011, pp. 1-18.*
Geoff Knagge, ASIC Design for Signal Processing: Complex Number Multipliers, 2010, pp. 1.*
Guenter, Complex Math: Complex Multiplier, 2011, pp. 1-4.*

* cited by examiner

$$x'(n,k) = \left( \left( x(n) + x(n+64)e^{j\pi k} \right) + \left( x(n+32) + x(n+96)e^{j\pi k} \right) e^{j\frac{\pi}{2}k} \right) +$$

$$\left( \left( x(n+8) + x(n+72)e^{j\pi k} \right) + \left( x(n+40) + x(n+104)e^{j\pi k} \right) e^{j\frac{\pi}{2}k} \right) e^{j\frac{\pi}{8}k} +$$

$$\left( \left( x(n+16) + x(n+80)e^{j\pi k} \right) + \left( x(n+48) + x(n+112)e^{j\pi k} \right) e^{j\frac{\pi}{2}k} \right) e^{j\frac{\pi}{4}k} +$$

$$\left( \left( x(n+24) + x(n+88)e^{j\pi k} \right) + \left( x(n+56) + x(n+120)e^{j\pi k} \right) e^{j\frac{\pi}{2}k} \right) e^{j\frac{3\pi}{8}k}$$

DIGITAL ARCHITECTURE FOR DFT/IDFT HARDWARE

BACKGROUND

1. Field of the Invention

The present invention relates to integrated circuit design. Specifically, the present invention relates to a digital hardware that can be used to determine a discrete Fourier transform (DFT) or an inverse discrete Fourier transform (IDFT).

2. Related Art

Discrete Fourier transform (DFT) and inverse discrete Fourier transform (IDFT) are used in a wide range of applications, such as, signal processing, image processing, data compression, etc., for transforming signals from time domain to frequency domain and vice-versa.

Exponential increase in networking bandwidth and storage capacity has created a need for high throughput DFT/IDFT circuits. Further, low complexity circuits are preferable over high complexity circuits, since, in general, they consume less power and are less expensive from the silicon real-estate perspective. Hence, low complexity DFT/IDFT circuits that have a high throughput are desirable.

SUMMARY

One embodiment of the present invention provides a system for computing a DFT or an IDFT. An embodiment uses a DFT or an IDFT formulation as the starting point instead of using a FFT (fast Fourier transform) or using an IFFT (inverse fast Fourier transform) formulation as the starting point. Terms in the DFT or IDFT formulation are re-arranged so that the embodiment has low complexity and high throughput.

Embodiments of the present invention can be used in a wide range of applications, such as: signal processing, image processing, video processing, electrical communication, etc.

DETAILED DESCRIPTION

Integrated Circuit (IC) Design Flow

Figure 1:
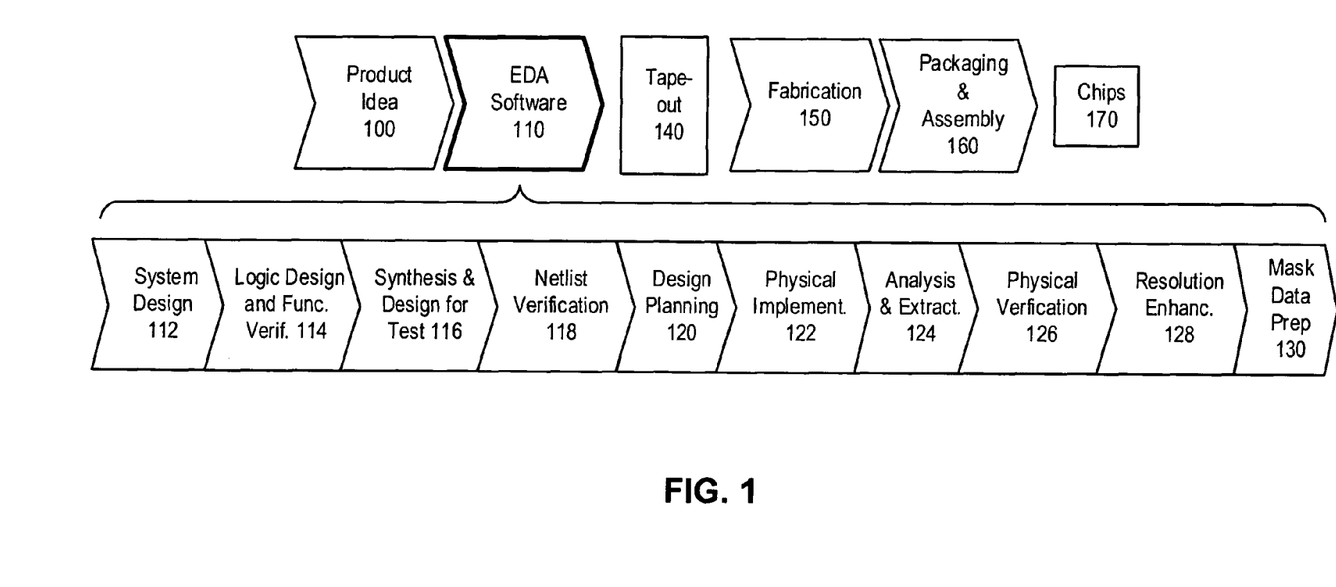
FIG. 1 illustrates various steps in the design and fabrication of an integrated circuit in accordance with an embodiment of the present invention.

FIG. 1 illustrates various stages in the design and fabrication of an integrated circuit in accordance with an embodiment of the present invention.

The process starts with the conception of the product idea (stage 100) which is realized using an EDA software design process (stage 110). When the design is finalized, it can be taped-out (event 140). After tape out, the fabrication process (stage 150) and packaging and assembly processes (stage 160) are performed which ultimately result in finished chips (result 170).

The EDA software design process (stage 110), in turn, comprises stages 112-130, which are described below. Note that the design flow description is for illustration purposes only. This description is not meant to limit the present invention. For example, an actual integrated circuit design may require the designer to perform the design stages in a different sequence than the sequence described below. The following discussion provides further details of the stages in the design process.

System design (stage 112): In this stage, the designers describe the functionality they want to implement. They can also perform what-if planning to refine functionality, check cost, etc. This stage can also involve floating to fixed point conversion and fixing of data bus widths at various stages of the design to ensure that, with fixed point truncation, the performance goals in terms of signal to quantization noise ratio are satisfied. Hardware-software architecture partitioning can occur at this stage. Exemplary EDA software products from Synopsys, Inc. that can be used at this stage include Saber, System Studio, and DesignWare® products.

Logic design and functional verification (stage 114): At this stage, the VHDL or Verilog code for modules in the system is written and the design is checked for functional accuracy. More specifically, the design can be checked to ensure that it produces the correct outputs by comparing the output from the HDL description with that from the golden fixed point model created in stage 112. Exemplary EDA software products from Synopsys, Inc. that can be used at this stage include VCS, VERA, DesignWare®, Magellan, Formality, ESP and LEDA products.

Synthesis and design for test (stage 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this stage include Design Compiler®, Physical Compiler, Test Compiler, Power Compiler, FPGA Compiler, Tetramax, and DesignWare® products.

Netlist verification (stage 1118): At this stage, the netlist is checked for compliance with timing constraints and for correspondence with the VHDL/Verilog source code. Exemplary EDA software products from Synopsys, Inc. that can be used at this stage include Formality, PrimeTime, and VCS products.

Design planning (stage 120): Here, an overall floorplan for the chip is constructed and analyzed for timing and top-level routing. Exemplary EDA software products from Synopsys, Inc. that can be used at this stage include Astro and IC Compiler products.

Physical implementation (stage 122): Placement (positioning of circuit elements) and routing (connection of the same) occur at this stage. Exemplary EDA software products from Synopsys, Inc. that can be used at this stage include the Astro and IC Compiler products.

Analysis and extraction (stage 124): At this stage, the circuit function is verified at a transistor level, this in turn permits what-if refinement. Exemplary EDA software products from Synopsys, Inc. that can be used at this stage include AstroRail, PrimeRail, Primetime, and Star RC/XT products.

Physical verification (stage 126): In this stage, the design is checked to ensure correctness for manufacturing, electrical issues, lithographic issues, and circuitry. Exemplary EDA software products from Synopsys, Inc. that can be used at this stage include the Hercules product.

Resolution enhancement (stage 128): This stage involves geometric manipulations of the layout to improve manufacturability of the design. Exemplary EDA software products from Synopsys, Inc. that can be used at this stage include Proteus, ProteusAF, and PSMGen products.

Mask data preparation (stage 130): This stage provides the "tape-out" data for production of masks to produce finished chips. Exemplary EDA software products from Synopsys, Inc. that can be used at this stage include the CATS(R) family of products.

Embodiments of the present invention can be used during one or more of the above-described stages. Specifically, one embodiment of the present invention can be used during the system design stage 112.

DFT Computation

Conventional techniques for computing a DFT typically use variations of the Cooley-Turkey algorithm for Fast Fourier Transform (FFT). However, these techniques usually suffer from the following issues which limit their applicability in applications that require very high throughput, for example 528 Msps128 point FFT required by Multiband OFDM (orthogonal frequency division multiplexing) modems:

a. Conventional architectures typically require that a minimum of $N\log_2 N$ complex rotations be performed in N clock cycles along with other operations. This usually necessitates a massively parallel bank of high speed complex multipliers, which can significantly increase the equivalent gatecount of the hardware. In such cases, it may also be necessary to employ a system clock with a frequency that is an integral fraction of the serial throughput. This can further increase the degree of parallelism, since the number of available clock cycles for every block of data reduces. Replacing each complex multiplier with a CORDIC (coordinate rotation digital computers) may not provide much benefit because of the iterative nature of the CORDIC computation and the unrolling and pipelining that is necessary to achieve the required throughput with those CORDICs.

b. Conventional architectures usually employ RAM (Random access memory) to store the partial computations. Due to parallel nature of the operations, the number of distinct RAM blocks required would be high, as would be their throughput requirement. Further, to enable continuous operation, we would need to maintain two copies of the RAM to prevent data overwrite through pipelines. It may be noted that segmentation of RAMs is very inefficient area-wise due to the decoding overhead.

c. Conventional architectures typically require massive intercommunication between the partial result computation blocks, reducing the routability of the designs and ultimately impacting the area and yield.

To summarize, conventional techniques are usually not good for designing low complexity circuits that can perform DFT/IDFT computations at high throughputs.

One embodiment of the present invention includes a low complexity circuit that performs DFT computations at high throughputs. An embodiment may employ:

a. Innovative data scheduling to optimally group and exploit commonality in computations and thereby decreasing the number of non trivial rotation (twiddle factor multiplication) operations that are required.

b. The innovative data flow can ensure that the non-trivial rotations can be computed serially through CORDIC irrespective of the throughput.

c. The data flow can be fully feed-forward except for the accumulators at the output and hence there is no requirement to store intermediate computations for feeding back. This can remove any necessity of employing RAMs in the present embodiment.

d. The feed-forward and regular nature of the computations (achieved by the innovative data flow) can improve the routability of the design, which can help to reduce the silicon area and to improve manufacturability.

e. The feed-forward nature of computation can also remove any bottleneck in continuous processing of blocks of data without any initialization requirement.

f. The throughput that can be achieved with the present invention can be independent of the latency through the circuit. Again, this is due to the feed-forward nature of the architecture.

A DFT/IDFT Architecture

Figure 2:
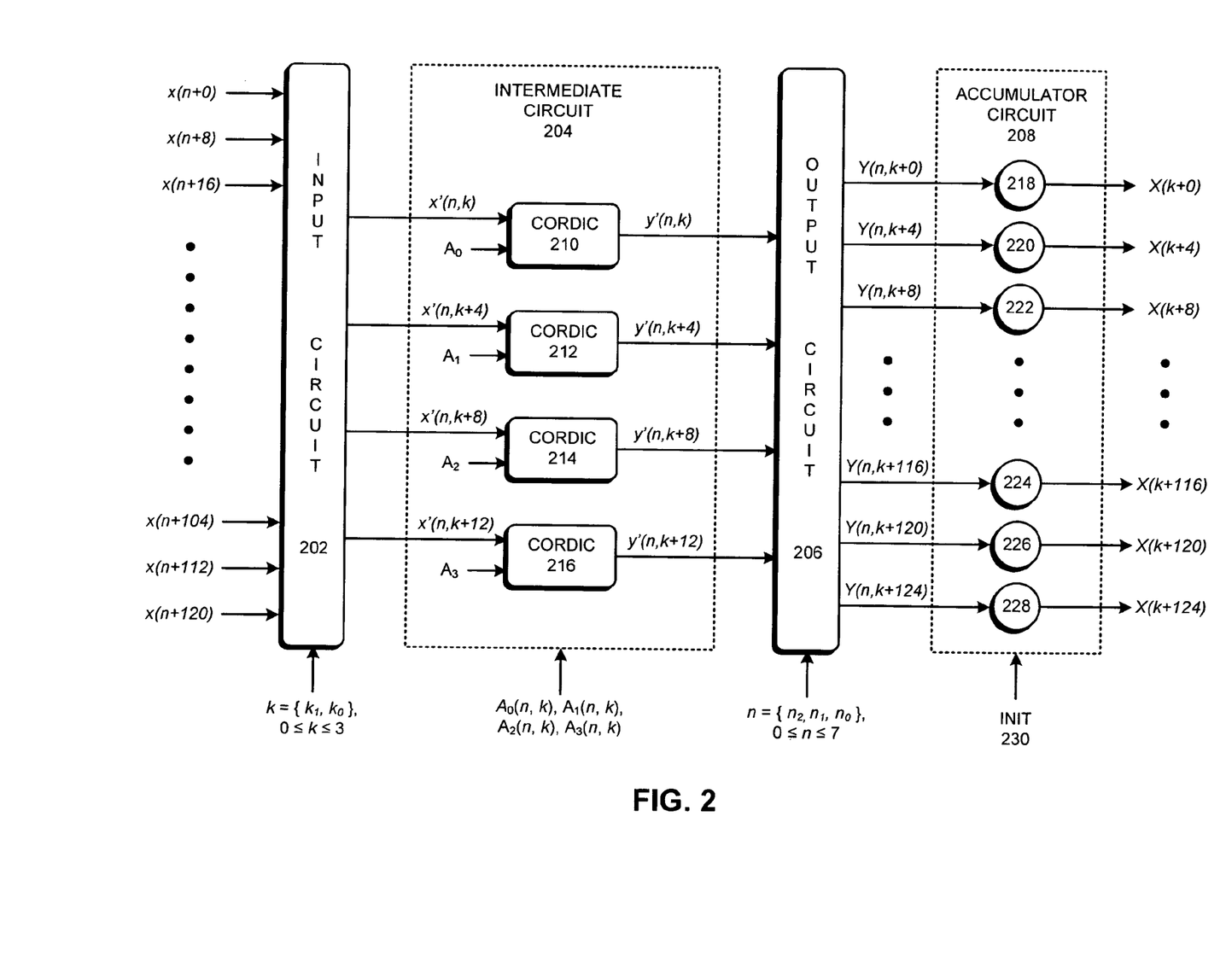
FIG. 2 illustrates a circuit that can be used to determine a DFT or an IDFT in accordance with an embodiment of the present invention.

FIG. 2 illustrates a circuit that can be used to determine a DFT or an IDFT in accordance with an embodiment of the present invention. The circuit is explained in the context of an IDFT computation, but, as explained below, the circuit can be converted from an IDFT core to a DFT core by swapping the real and imaginary channels of the inputs and the outputs.

The circuit illustrated in FIG. 2 includes an input circuit 202, intermediate circuit 204, output circuit 206, and accumulator circuit 208.

Input circuit 202 receives a set of input values which can be a subset of a larger set of input values. The circuit shown in FIG. 2 may be used to compute the DFT and/or IDFT over multiple clock cycles. In each clock cycle, input circuit 202 may receive a subset of a larger set of input values. Note that the entire set of input values can be received before the computation of any output value is complete.

For example, the circuit shown in FIG. 2 may be used to compute a 128-point DFT and/or a 128-point IDFT. In clock cycle "n," input circuit 202 may receive 16 equi-spaced input values, namely, $x(n+0)$, $x(n+8)$, $x(n+16)$, . . . , $x(n+104)$, $x(n+112)$, $x(n+120)$, out of a total of 128 input values, namely, $x(0), x(1), x(2), \ldots, x(127)$. Note that the input values can be complex numbers which can be represented using real and imaginary components.

Input circuit 202 can include a first set of degenerate rotators. In one embodiment, a degenerate rotator receives a complex number as input and rotates the complex number by an angle $\pi/2^r$, where r is an integer. Input circuit 202 can use the first set of degenerate rotators to generate a first set of intermediate values, namely, $x'(n,k)$, $x'(n,k+4)$, $x'(n,k+8)$, and $x'(n,k+12)$. Note that input circuit 202 may receive the value of "k" as an input. In the embodiment shown in FIG. 2, k is represented as a 2-bit number $\{k_1, k_0\}$, where $k_0$ is the LSB (least significant bit).

Intermediate circuit 204 can receive the set of intermediate values that were generated by input circuit 202. Intermediate circuit 204 can include CORDICs (coordinate rotation digital computers), such as CORDICs 210, 212, 214, and 216. Intermediate circuit 204 can use the CORDICs to generate a second set of intermediate values, namely, y'(n,k), y'(n,k+4), y'(n,k+8), and y'(n,k+12). A CORDIC receives a complex number as input and rotates the complex number by an angle, which can be supplied as an input to the CORDIC. For example, CORDICs 210, 212, 214, and 216 rotate values x'(n,k), x'(n,k+4), x'(n,k+8), and x'(n,k+12), respectively, by angles, $A_0(n, k)$, $A_1(n, k)$, $A_2(n, k)$, and $A_3(n, k)$, respectively. Note that intermediate circuit 204 may receive the above angles as inputs.

Output circuit 206 can receive the second set of intermediate values that were generated by intermediate circuit 204. Output circuit 206 can include a second set of degenerate rotators. Output circuit 206 can use the second set of degenerate rotators to generate a third set of intermediate values (which may be complex), namely, Y(n, k), Y(n, k+4), Y(n, k+8), . . . , Y(n, k+116), Y(n, k+120), Y(n, k+124). Note that in the embodiment shown in FIG. 2, the third set of intermediate values contains 32 values. Output circuit 206 may receive the value of "n" as an input. In the embodiment shown in FIG. 2, n is represented as a 3-bit number $\{n_2, n_1, n_0\}$, where $n_0$ is the LSB.

Accumulator circuit 208 can receive the third set of intermediate values that were generated by output circuit 206. Accumulator circuit 208 can include accumulators 218, 220, 222, 224, 226, and 228. An accumulator can receive an input value and can add the input value to the value stored in the accumulator. Note that the accumulator's input value may be a complex number and the value stored in the accumulator may also be a complex number. Accumulator circuit 208 can use the accumulators to generate a set of output values, namely, X(k+0), X(k+4), X(k+8), . . . , X(k+116), X(k+120), X(k+124). The number of accumulators can be same as the degree of parallelism of the output circuit. For irregularly scheduled operation, accumulator circuit 208 may receive an external "INIT" signal 230 which it can use to clear the set of accumulators.

Figure 3:
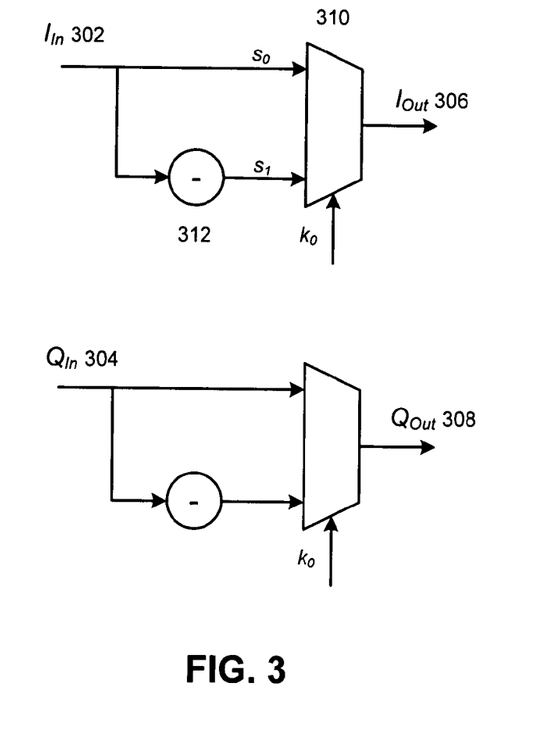
FIG. 3 illustrates a π rotator in accordance with an embodiment of the present invention.

FIG. 3 illustrates a π rotator in accordance with an embodiment of the present invention.

The π rotator shown in FIG. 3 is a degenerate rotator that can receive a complex number as input with real component $I_{In}$ 302 and imaginary component $Q_{In}$ 304. The π rotator can output a complex number with real component $I_{Out}$ 306 and imaginary component $Q_{Out}$ 308. The π rotator can comprise multiplexers, such as, multiplexer 310, and sign-changers, such as sign-changer 312. The multiplexers shown in FIG. 3 use the value of $k_0$ as a control bit. If the degenerate rotator is used in output circuit 206, it can use the value of $n_0$ instead of using the value of $k_0$.

When $k_0=0$, the multiplexer selects the top multiplexer input $s_0$, and when $k_0=1$, the multiplexer selects the bottom multiplexer input $s_1$. Hereinafter, all multiplexers are configured to select the top input when the control bit is 0, and to select the bottom input when the control bit is 1.

A multiplexer can generally be any circuit that couples an input with an output, wherein the multiplexer selects the input from a set of inputs using a set of control bits. A sign-changer can generally be any circuit that receives an input value, and generates an output value by changing the sign of the input value.

Figure 4:
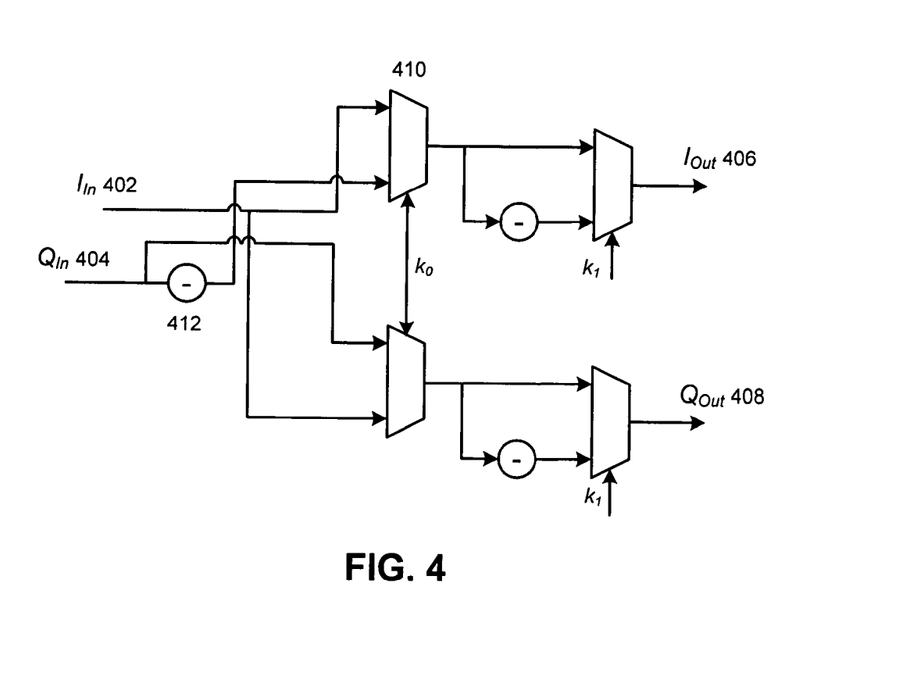
FIG. 4 illustrates a or π/2 rotator in accordance with an embodiment of the present invention.

FIG. 4 illustrates a π/2 rotator in accordance with an embodiment of the present invention.

The π/2 rotator shown in FIG. 4 is a degenerate rotator that can receive a complex number as input with real component $I_{In}$ 402 and imaginary component $Q_{In}$ 404. The π/2 rotator can output a complex number with real component $I_{Out}$ 406 and imaginary component $Q_{Out}$ 408. The π/2 rotator can comprise multiplexers, such as, multiplexer 410, and sign-changers, such as sign-changer 412. Note that some multiplexers shown in FIG. 4 can use the value of $k_0$ as a control bit, whereas other multiplexers can use the value of $k_1$ as a control bit. If the degenerate rotator is used in output circuit 206, the multiplexers can use values of $n_0$ and $n_1$ instead of using values of $k_0$ and $k_1$.

The addition, subtraction, and sign changing operations can be performed in two's complement format. Further, a sign changer can prevent overflow by outputting value $2^{(N-1)}$ when the input is equal to $-2^N$.

Figure 5:
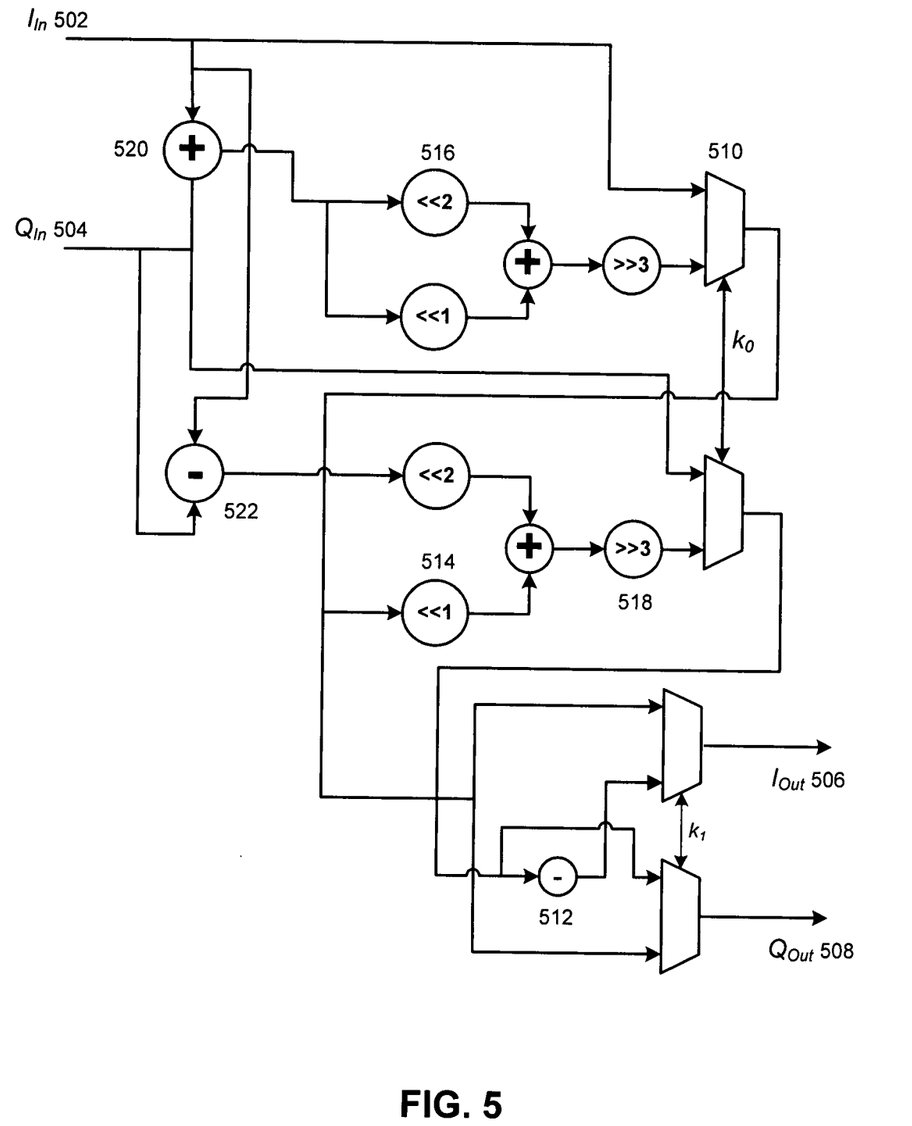
FIG. 5 illustrates a π/4 rotator in accordance with an embodiment of the present invention.

FIG. 5 illustrates a π/4 rotator in accordance with an embodiment of the present invention.

The π/4 rotator shown in FIG. 5 is a degenerate rotator that can receive a complex number as input with real component $I_{In}$ 502 and imaginary component $Q_{In}$ 504. The π/4 rotator can output a complex number with real component $I_{Out}$ 506 and imaginary component $Q_{Out}$ 508. The π/4 rotator can comprise multiplexers, such as, multiplexer 510, and sign-changers, such as sign-changer 512. Further, the π/4 rotator can include shifters, such as, shifters 514, 516, and 518. Shifter 514 shifts its input to the left by one bit, which is equivalent to multiplying the input by 2. Shifter 516 shifts its input to the left by two bits, which is equivalent to multiplying the input by 4. Shifter 518 shifts its input to the right by three bits, which is equivalent to dividing the input by 8. Right shift operations can be sign extensions in accordance with two's complement arithmetic. The circuit may increase the bitwidth during a left shift operation to ensure that the sign is not reversed. Similarly, the circuit may increase the bitwidth during addition and subtraction operations.

The π/4 rotator can also comprise adders and subtracters, such as, adder 520 and subtracter 522. An adder can generally be any circuit whose output is equal to the summation of its inputs. A subtracter can generally be any circuit whose output is equal to the difference between its inputs. In one embodiment an adder and a subtracter can be realized using the same type of circuit, e.g., an adder-subtracter circuit. Note that some multiplexers shown in FIG. 5 can use the value of $k_0$ as a control bit, whereas other multiplexers can use the value of $k_1$ as a control bit. If the degenerate rotator is used in output circuit 206, the multiplexers can use values of $n_0$ and $n_1$ instead of using values of $k_0$ and $k_1$.

Figure 6:
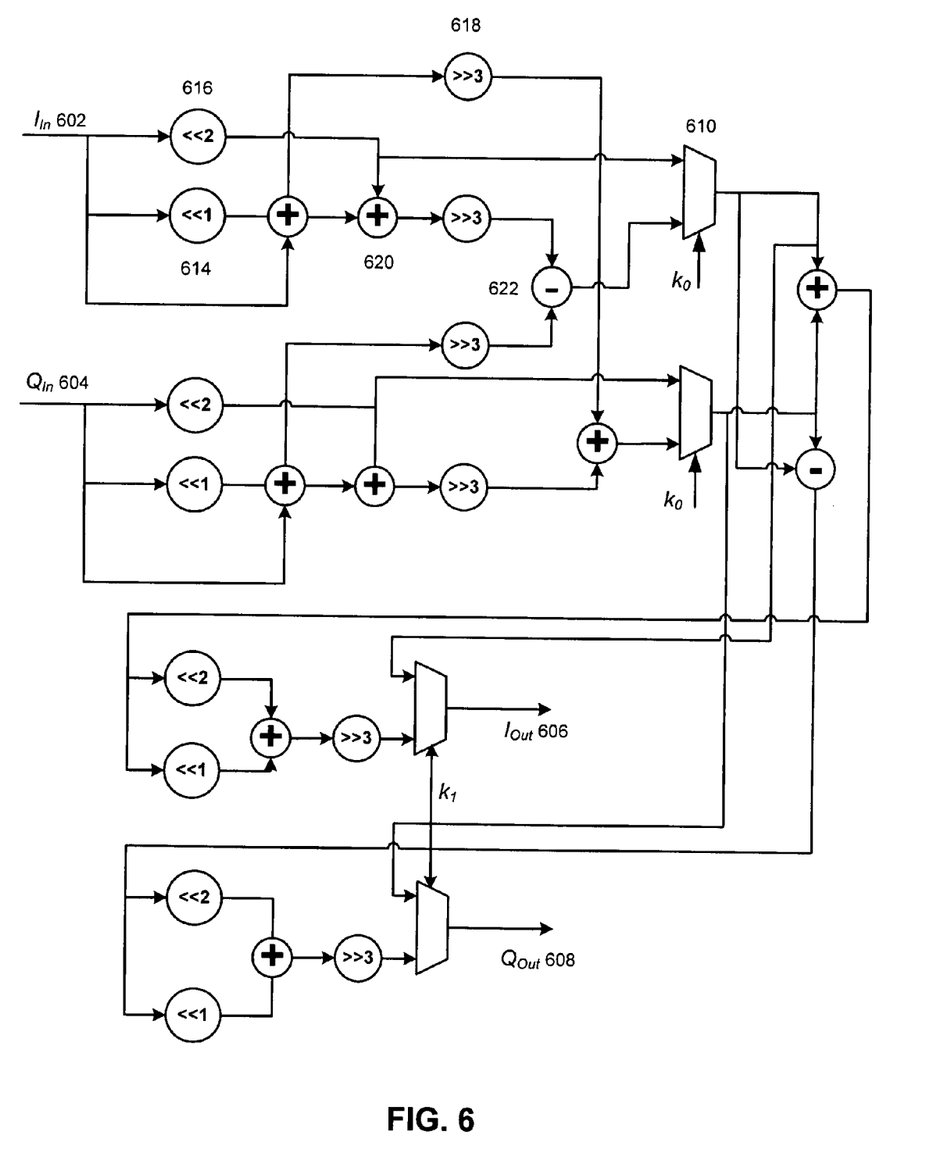
FIG. 6 illustrates a π/8 rotator in accordance with an embodiment of the present invention.

FIG. 6 illustrates a π/8 rotator in accordance with an embodiment of the present invention.

The π/8 rotator shown in FIG. 6 is a degenerate rotator that can receive a complex number as input with real component $I_{In}$ 602 and imaginary component $Q_{In}$ 604. The π/8 rotator can output a complex number with real component $I_{Out}$ 606 and imaginary component $Q_{Out}$ 608. The π/8 rotator can comprise multiplexers, such as, multiplexer 610. Further, the π/8 rotator can comprise shifters, such as, shifters 614, 616, and 618. Shifter 614 shifts its input to the left by one bit, which is equivalent to multiplying the input by 2. Shifter 616 shifts its input to the left by two bits, which is equivalent to multiplying the input by 4. Shifter 618 shifts its input to the right by three bits, which is equivalent to dividing the input by 8. The π/8 rotator can also comprise adders and subtracters, such as, adder 620 and subtracter 622. Note that some multiplexers shown in FIG. 6 can use the value of $k_0$ as a control bit, whereas other multiplexers can use the value of $k_1$ as a control bit. If the degenerate rotator is used in output circuit 206, the multiplexers can use values of $n_0$ and $n_1$ instead of using values of $k_0$ and $k_1$.

Figure 7:
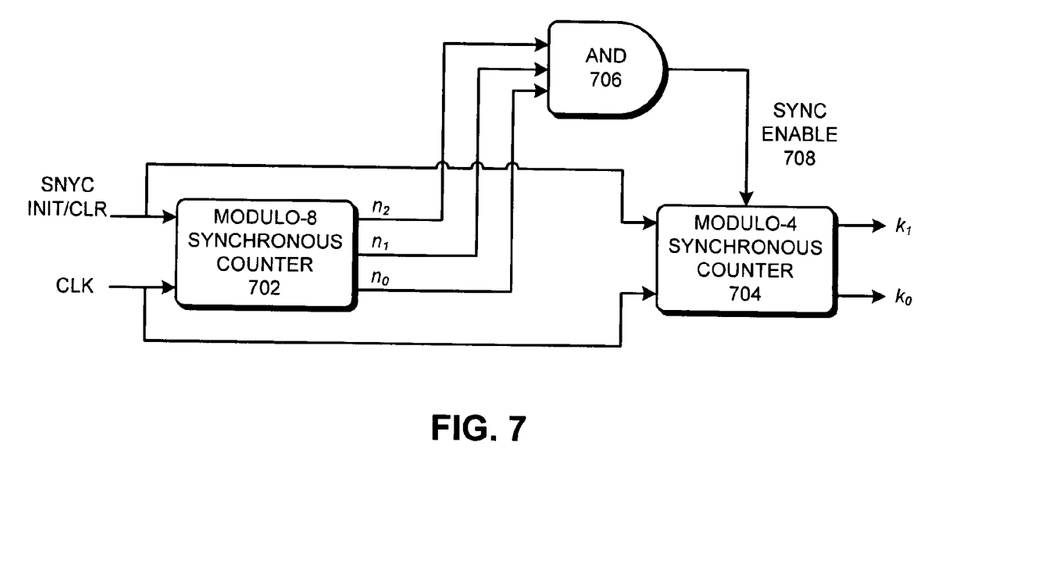
FIG. 7 illustrates how n and k values can be generated in accordance with an embodiment of the present invention.

FIG. 7 illustrates how n and k values can be generated in accordance with an embodiment of the present invention.

Recall that the circuit shown in FIG. 2 uses the values of $n=\{n_2, n_1, n_0\}$ and $k=\{k_1, k_0\}$ in output circuit 206 and input circuit 202, respectively. In one embodiment, the circuit shown in FIG. 2 computes a DFT and/or an IDFT over 32 clock cycles during which the values of n and k are given by the following table (Clk is the clock cycle, n is a running index of the input, and k is a running index of the output):

| Clk | n | k |
|-----|---|---|
| 0   | 0 | 0 |
| 1   | 1 | 0 |
| 2   | 2 | 0 |
| 3   | 3 | 0 |
| 4   | 4 | 0 |
| 5   | 5 | 0 |
| 6   | 6 | 0 |
| 7   | 7 | 0 |
| 8   | 0 | 1 |
| 9   | 1 | 1 |
| 10  | 2 | 1 |
| 11  | 3 | 1 |
| 12  | 4 | 1 |
| 13  | 5 | 1 |
| 14  | 6 | 1 |
| 15  | 7 | 1 |
| 16  | 0 | 2 |
| 17  | 1 | 2 |
| 18  | 2 | 2 |
| 19  | 3 | 2 |
| 20  | 4 | 2 |
| 21  | 5 | 2 |
| 22  | 6 | 2 |
| 23  | 7 | 2 |
| 24  | 0 | 3 |
| 25  | 1 | 3 |
| 26  | 2 | 3 |
| 27  | 3 | 3 |
| 28  | 4 | 3 |
| 29  | 5 | 3 |
| 30  | 6 | 3 |
| 31  | 7 | 3 |

The circuit shown in FIG. 7 includes two modulo circuits, namely, modulo-8 synchronous counter 702 and modulo-4 synchronous counter 704, which can be used to generate values for n and k, respectively, in accordance with the above table. Both of these modulo circuits can receive an initialization and/or clear signal SYNC INIT/CLR in case of irregularly scheduled operations and a clock signal CLK.

Modulo-8 synchronous counter 702 can be used to generate modulo value $n=\{n_2, n_1, n_0\}$, where $n_0$ is the LSB. This modulo value can then be used by output circuit 206 (shown in FIG. 2) to generate the third set of intermediate values. Modulo-4 synchronous counter 704 can be used to generate modulo value $k=\{k_1, k_0\}$, where $k_0$ is the LSB. This modulo value can then be used by input circuit 202 (shown in FIG. 2) to generate the first set of intermediate values. In one embodiment, the bits $\{n_2, n_1, n_0\}$ can be fed into AND gate 706 whose output can be fed into modulo-4 synchronous counter 704's synchronous enable input 708. When the synchronous enable input 708 is asserted, it will cause modulo-4 synchronous counter 704 to respond to the clock signal CLK. For example, when n=7 and synchronous enable input 708 is asserted, modulo-4 synchronous counter 704 will increment the value of k in the next clock cycle.

Figure 8:
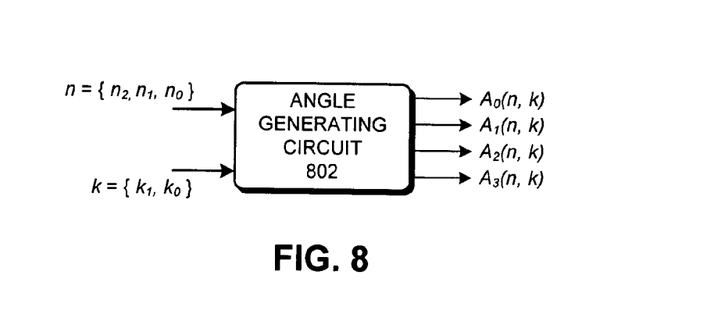
FIG. 8 illustrates an angle-generating circuit in accordance with an embodiment of the present invention.

FIG. 8 illustrates an angle-generating circuit in accordance with an embodiment of the present invention.

Recall that CORDICs 210, 212, 214, and 216 in FIG. 2 use angle values $A_0(n, k)$, $A_1(n, k)$, $A_2(n, k)$, and $A_3(n, k)$, respectively, to generate their output values. Angle-generating circuit 802 can receive $n=\{n_2, n_1, n_0\}$ and $k=\{k_1, k_0\}$ as inputs and generate angle values $A_0(n, k)$, $A_1(n, k)$, $A_2(n, k)$, and $A_3(n, k)$, as outputs. In one embodiment, the angle values can be represented by the following expressions:

$$A_0(n, k) = \frac{2\pi n k}{128}, \quad (1)$$

$$A_1(n, k) = \frac{2\pi n(k + 4)}{128},$$

$$A_2(n, k) = \frac{2\pi n(k + 8)}{128},$$

$$A_3(n, k) = \frac{2\pi n(k + 12)}{128}.$$

Angle-generating circuit 802 can generally be any circuit that can generate the angle values in accordance with the above expressions. The angle can be represented as a 7-bit unsigned binary and computed as nk, n(k+4), n(k+8), and n(k+12). An embodiment may not require a negative angle and thus unsigned representation may suffice. We may need to ensure that the reference angle representation inside the CORDICs is also consistent. If the CORDICs require negative angle values, an unsigned to two's complement extension would suffice.

Figure 14:
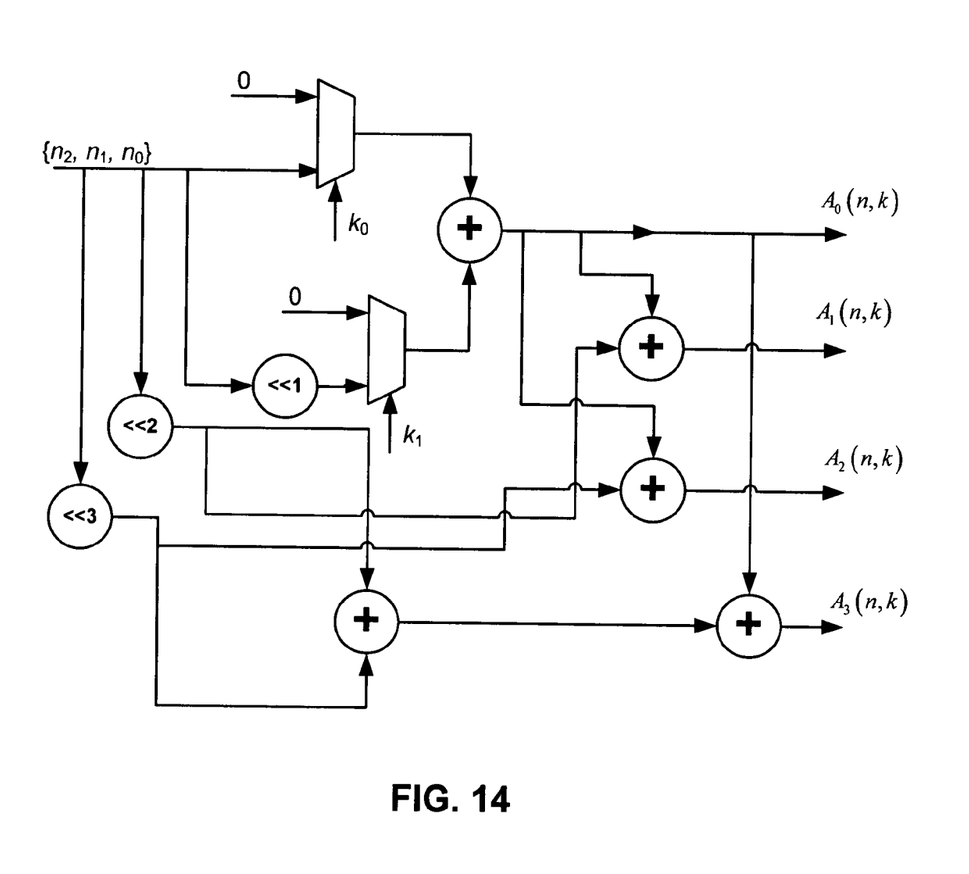
FIG. 14 illustrates an angle generating circuit that does not employ any multipliers in accordance with an embodiment of the present invention.

FIG. 14 illustrates an angle-generating circuit that does not employ any multipliers in accordance with an embodiment of the present invention.

The circuit shown in FIG. 14 receives $\{n_2, n_1, n_0\}$ and $\{k_1, k_0\}$ as inputs and generates $A_0(n, k)$, $A_1(n, k)$, $A_2(n, k)$, and $A_3(n, k)$ as outputs. Note that the circuit employs multiplexers, shifters, and adders, but does not employ any multipliers.

Figure 9:
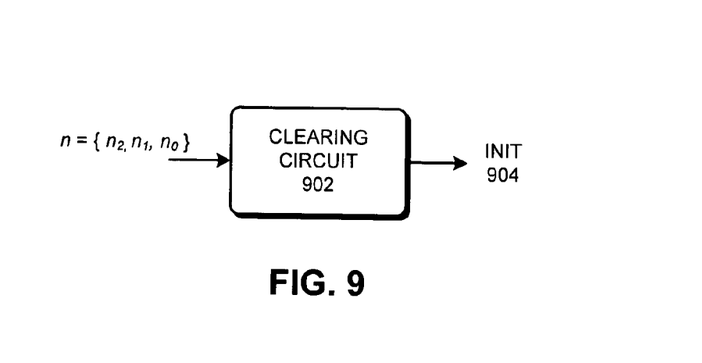
FIG. 9 illustrates a clearing circuit in accordance with an embodiment of the present invention.

FIG. 9 illustrates a clearing circuit in accordance with an embodiment of the present invention.

Recall that accumulator circuit 208 shown in FIG. 2 can receive an "INIT" signal 230 which can be used to clear the set of accumulators. Clearing circuit 902 can generate an "INIT" signal 904 using the value of n. In particular, clearing circuit 902 can generate "INIT" signal 904 when n=0. Hence, in the embodiment shown in FIG. 2, the accumulators will be cleared every 8 clock cycles.

The circuit shown in FIG. 2 can be used to compute a 128-point DFT or a 128-poin IDFT every 32 clock cycles. Input circuit 202 can receive 16 input values every clock cycle. Note that input circuit 202 will receive the same input value 4 times during the 32 clock cycles. Accumulator circuit 208 generates 32 output values every 8 clock cycles, thereby generating 128 output values over 32 clock cycles.

IDFT Formulation

The following expressions illustrate the relationship between the various input values and output values shown in FIG. 2.

An IDFT can be expressed as:

$$X(k) = \sum_{n=0}^{127} x(n) e^{j\frac{2\pi k n}{128}} = \sum_{n=0}^{7} x'(n, k) e^{j\frac{2\pi k n}{128}}, \; 0 \leq k < 128 \quad (2)$$

where, X(k) is the IDFT of x(n), $0 \leq k, n \leq 127$, and $$x'(n, k) = ((x(n) + x(n+64)e^{j\pi k}) + (x(n+32) + x(n+96)e^{j\pi k})e^{j\frac{\pi}{2}k}) + \qquad (3)$$
$$((x(n+8) + x(n+72)e^{j\pi k}) + (x(n+40) +$$
$$x(n+104)e^{j\pi k})e^{j\frac{\pi}{2}k})e^{j\frac{\pi}{8}k} + ((x(n+16) + x(n+80)e^{j\pi k}) +$$
$$(x(n+48) + x(n+112)e^{j\pi k})e^{j\frac{\pi}{2}k})e^{j\frac{\pi}{4}k} +$$
$$((x(n+24) + x(n+88)e^{j\pi k}) + (x(n+56) + x(n+120)e^{j\pi k})e^{j\frac{\pi}{2}k})e^{j\frac{3\pi}{8}k}.$$

The other outputs of input circuit 202, namely, x'(n,k+4), x'(n,k+8), and x'(n,k+12), can be expressed as:

$$x'(n, k+4) = \qquad (4)$$
$$((x(n) + x(n+64)e^{j\pi k}) + (x(n+32) + x(n+96)e^{j\pi k})e^{j\frac{\pi}{2}k}) +$$
$$((x(n+8) + x(n+72)e^{j\pi k}) +$$
$$(x(n+40) + x(n+104)e^{j\pi k})e^{j\frac{\pi}{2}k})e^{j\frac{\pi}{8}k}e^{j\frac{\pi}{2}} +$$
$$((x(n+16) + x(n+80)e^{j\pi k}) +$$
$$(x(n+48) + x(n+112)e^{j\pi k})e^{j\frac{\pi}{2}k})e^{j\frac{\pi}{4}k}e^{j\frac{\pi}{2}} +$$
$$((x(n+24) + x(n+88)e^{j\pi k}) +$$
$$(x(n+56) + x(n+120)e^{j\pi k})e^{j\frac{\pi}{2}k})e^{j\frac{3\pi}{8}k}e^{j\frac{\pi}{2}},$$

$$x'(n, k+8) = \qquad (5)$$
$$((x(n) + x(n+64)e^{j\pi k}) + (x(n+32) + x(n+96)e^{j\pi k})e^{j\frac{\pi}{2}k}) +$$
$$((x(n+8) + x(n+72)e^{j\pi k}) +$$
$$(x(n+40) + x(n+104)e^{j\pi k})e^{j\frac{\pi}{2}k})e^{j\frac{\pi}{8}k}e^{j\pi} +$$
$$((x(n+16) + x(n+80)e^{j\pi k}) +$$
$$(x(n+48) + x(n+112)e^{j\pi k})e^{j\frac{\pi}{2}k})e^{j\frac{\pi}{4}k} +$$
$$((x(n+24) + x(n+88)e^{j\pi k}) +$$
$$(x(n+56) + x(n+120)e^{j\pi k})e^{j\frac{\pi}{2}k})e^{j\frac{3\pi}{8}k}e^{j\pi},$$
and $$x'(n, k+12) = \qquad (6)$$
$$((x(n) + x(n+64)e^{j\pi k}) + (x(n+32) + x(n+96)e^{j\pi k})e^{j\frac{\pi}{2}k}) +$$
$$((x(n+8) + x(n+72)e^{j\pi k}) + (x(n+40) + x(n+104)e^{j\pi k})e^{j\frac{\pi}{2}k})$$
$$e^{j\frac{\pi}{8}k}e^{j\pi} + e^{j\frac{\pi}{2}}((x(n+16) + x(n+80)e^{j\pi k}) +$$
$$(x(n+48) + x(n+112)e^{j\pi k})e^{j\frac{\pi}{2}k})e^{j\frac{\pi}{4}k}e^{j\pi} +$$
$$((x(n+24) + x(n+88)e^{j\pi k}) + (x(n+56) + x(n+120)e^{j\pi k})e^{j\frac{\pi}{2}k})$$
$$e^{j\frac{3\pi}{8}k}e^{j\pi}e^{j\frac{\pi}{2}}.$$

The outputs of intermediate circuit 204, can be expressed as:

$$y'(n, k) = x'(n, k)e^{j\frac{2\pi kn}{128}}, \qquad (7)$$
$$y'(n, k+4) = x'(n, k+4)e^{j\frac{2\pi(k+4)n}{128}},$$
$$y'(n, k+8) = x'(n, k+8)e^{j\frac{2\pi(k+8)n}{128}},$$
$$y'(n, k+12) = x'(n, k+12)e^{j\frac{2\pi(k+12)n}{128}}.$$

Eight of the 32 outputs of output circuit 206 can be expressed as:

$$Y(n, k) = x'(n, k)e^{j\frac{2\pi kn}{128}} = y'(n, k)e^{j\frac{2\pi kn}{128}}, \qquad (8)$$

$$Y(n, k+16) = x'(n, k+16)e^{j\frac{2\pi(k+16)n}{128}} = y'(n, k)e^{j\frac{\pi n}{4}},$$
$$Y(n, k+32) = x'(n, k+32)e^{j\frac{2\pi(k+32)n}{128}} = y'(n, k)e^{j\frac{\pi n}{2}},$$
$$Y(n, k+48) = x'(n, k+48)e^{j\frac{2\pi(k+48)n}{128}} = y'(n, k)e^{j\frac{\pi n}{2}}e^{j\frac{\pi n}{4}},$$
$$Y(n, k+64) = x'(n, k+64)e^{j\frac{2\pi(k+64)n}{128}} = y'(n, k)e^{j\pi n},$$
$$Y(n, k+80) = x'(n, k+80)e^{j\frac{2\pi(k+80)n}{128}} = y'(n, k)e^{j\frac{\pi n}{4}},$$
$$Y(n, k+96) = x'(n, k+96)e^{j\frac{2\pi(k+96)n}{128}} = y'(n, k)e^{j\frac{\pi n}{2}}e^{j\frac{\pi n}{4}},$$
$$Y(n, k+112) = x'(n, k+112)e^{j\frac{2\pi(k+112)n}{128}} = y'(n, k)e^{j\pi n}e^{j\frac{\pi n}{2}}e^{j\frac{\pi n}{4}}.$$

Output circuit 206 generates 32 Y values in each clock cycle. Expressions for eight of those Y values are shown in equation (8). The other 24 Y values can be similarly expressed in terms of y'(n,k+4), y'(n,k+8), and y'(n,k+12). For example, eight more Y values can be expressed in terms of y'(n,k+4) as follows:

$$Y(n, (k+4)) = x'(n, (k+4))e^{j\frac{2\pi(k+4)n}{128}} = y'(n, (k+4)), \qquad (9)$$
$$Y(n, (k+20)) =$$
$$x'(n, (k+4) + 16)e^{j\frac{2\pi((k+4)+16)n}{128}} = y'(n, (k+4))e^{j\frac{\pi n}{4}},$$
$$Y(n, (k+36)) = x'(n, (k+4) + 32)e^{j\frac{2\pi((k+4)+32)n}{128}} = y'(n, (k+4))e^{j\frac{\pi n}{2}},$$
$$\vdots$$
$$Y(n, (k+100)) =$$
$$x'(n, (k+4) + 96)e^{j\frac{2\pi((k+4)+96)n}{128}} = y'(n, (k+4))e^{j\frac{\pi n}{2}},$$
$$Y(n, (k+116)) = x'(n, (k+4) + 112)e^{j\frac{2\pi((k+4)+112)n}{128}} =$$
$$y'(n, (k+4))e^{j\pi n}e^{j\frac{\pi n}{2}}e^{j\frac{\pi n}{4}}.$$

Finally, the 32 output values of accumulator circuit 208 can be expressed as follows:

$$X(k) = \sum_{n=0}^{7} Y(k, n), \qquad (10)$$
$$X(k+4) = \sum_{n=0}^{7} Y(k+4, n),$$
$$X(k+8) = \sum_{n=0}^{7} Y(k+8, n),$$
$$\vdots \qquad \vdots$$
$$X(k+120) = \sum_{n=0}^{7} Y(k+120, n),$$
$$X(k+124) = \sum_{n=0}^{7} Y(k+124, n).$$

Note that an IDFT can be expressed as:

$$X(k) = \sum_{n=0}^{127} x(n)e^{j\frac{2\pi kn}{128}} \qquad (11)$$

-continued $$= \sum_{n=0}^{127} (x_I(n) + jx_Q(n))\left(\cos\left(\frac{2\pi kn}{128}\right) + j\sin\left(\frac{2\pi kn}{128}\right)\right)$$

$$= \sum_{n=0}^{127} \left(x_I(n)\cos\left(\frac{2\pi kn}{128}\right) - x_Q(n)\sin\left(\frac{2\pi kn}{128}\right)\right) +$$

$$j\sum_{n=0}^{127} \left(x_Q(n)\cos\left(\frac{2\pi kn}{128}\right) + x_I(n)\sin\left(\frac{2\pi kn}{128}\right)\right).$$

On the other hand, a DFT can be expressed as:

$$X(k) = \sum_{n=0}^{127} x(n)e^{-j\frac{2\pi kn}{128}} \qquad (12)$$

$$= \sum_{n=0}^{127} (x_I(n) + jx_Q(n))\left(\cos\left(\frac{2\pi kn}{128}\right) - j\sin\left(\frac{2\pi kn}{128}\right)\right)$$

$$= \sum_{n=0}^{127} \left(x_I(n)\cos\left(\frac{2\pi kn}{128}\right) + x_Q(n)\sin\left(\frac{2\pi kn}{128}\right)\right) +$$

$$j\sum_{n=0}^{127} \left(x_Q(n)\cos\left(\frac{2\pi kn}{128}\right) - x_I(n)\sin\left(\frac{2\pi kn}{128}\right)\right).$$

By comparing equations (11) and (12) we note that an IDFT circuit can be used as a DFT circuit by swapping the real and imaginary channels of the inputs and the outputs. Specifically, the IDFT circuit shown in FIG. 2 can be used as a DFT circuit by (a) swapping the real and imaginary channels of the inputs x(n), and (b) swapping the real and imaginary channels of the outputs X(k).

In one embodiment, a single circuit can be used for performing both IDFT operations as well as DFT operations. For example, the data from a receiver and a transmitter can be interleaved and the circuit can alternately perform IDFT computations for the transmitter data and DFT computations for the receiver data. The circuit shown in FIG. 2 can perform IDFT computations for the transmitter data for one block of data, and then, during the next block of data the circuit can perform DFT computations on the receiver data.

Using Degenerate Rotators

Note that equations (3)-(6) specify how input circuit 202 can use degenerate rotators to produce the input circuit 202's outputs. Similarly, equations (8)-(9) specify how output circuit 206 can use degenerate rotators to produce the output circuit 206's outputs.

Figure 10:
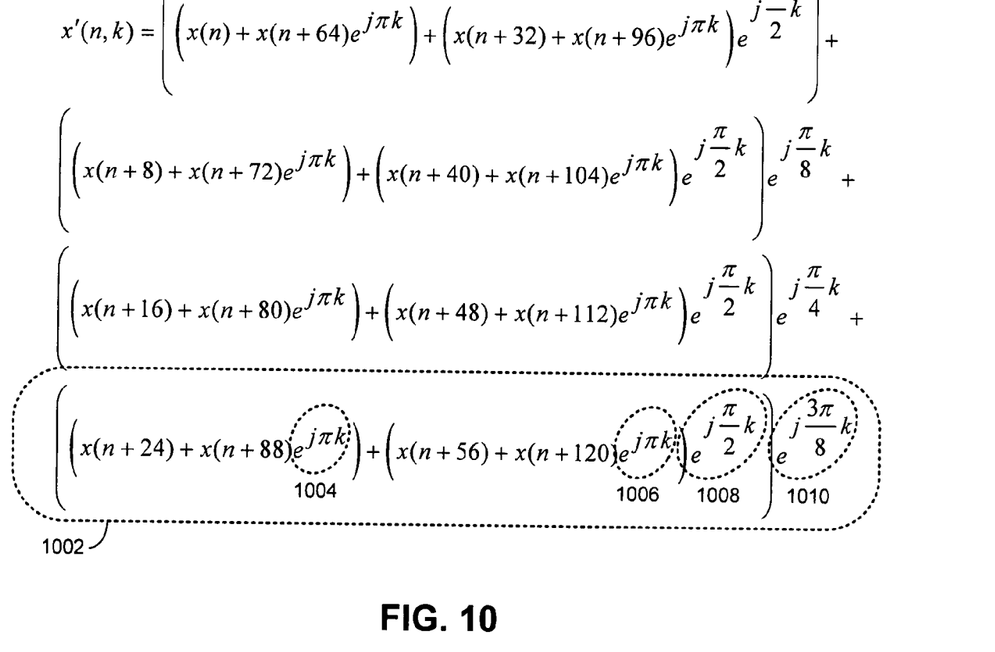
FIG. 10 illustrates an expression in accordance with an embodiment of the present invention.

FIG. 10 illustrates an expression in accordance with an embodiment of the present invention.

As shown in FIG. 10, equation (3) includes terms, such as, term 1002. In one embodiment, term 1002 can be realized using four degenerate rotators that correspond to terms 1004, 1006, 1008, and 1010.

Figure 11:
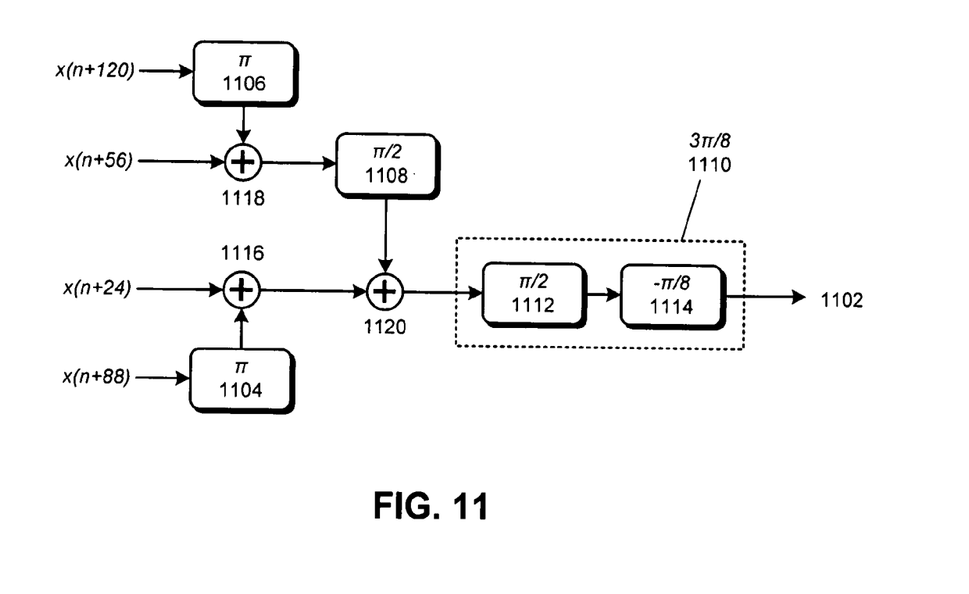
FIG. 11 illustrates how degenerate rotators can be used to realize an expression in accordance with an embodiment of the present invention.

FIG. 11 illustrates how degenerate rotators can be used to realize an expression in accordance with an embodiment of the present invention.

Inputs x(n+88) and x(n+120) can be fed into $\pi$ rotators 1104 and 1106 to generate values $x(n+88)e^{j\pi k}$ and $x(n+120)e^{j\pi k}$, respectively. Next, adders 1116 and 1118 can be used to add these values with inputs x(n+24) and x(n+56), respectively, to generate values $(x(n+24)+x(n+88)e^{j\pi k})$ and $(x(n+56)+x(n+120)e^{j\pi k})$, respectively. Next, the value $(x(n+56)+x(n+120)e^{j\pi k})$ can be fed into $\pi/2$ rotator 1108 to generate value $(x(n+56)+x(n+120)e^{j\pi k})e^{j\pi k/2}$. Next, adder 1120 can be used to add $(x(n+56)+x(n+120)e^{j\pi k})e^{j\pi k/2}$ with the output of adder 1116 to generate value $((x(n+24)+x(n+88)e^{j\pi k})+(x(n+56)+x(n+120)e^{j\pi k})e^{j\pi k/2})$. Finally, this value can be fed into $3\pi/8$ rotator 1110 to obtain output value 1102 which corresponds to the value of the expression 1002 shown in FIG. 10. Note that, in one embodiment, $3\pi/8$ rotator 1110 can be realized using $\pi/2$ rotator 1112 and $(-\pi/8)$ rotator 1114 in series as shown in FIG. 11. It will be apparent to one skilled in the art that a $(-\pi/8)$ rotator can be realized by changing the sign of a $\pi/8$ rotator's output imaginary channel.

The circuit illustrated in FIG. 11 is an embodiment that reduces the required number of degenerate rotators. Accordingly, many modifications and variations will be readily apparent to practitioners skilled in the art. For example, the expression 1002 can also be computed using a greater number of degenerate rotators to increase the amount of parallelism.

Figure 12:
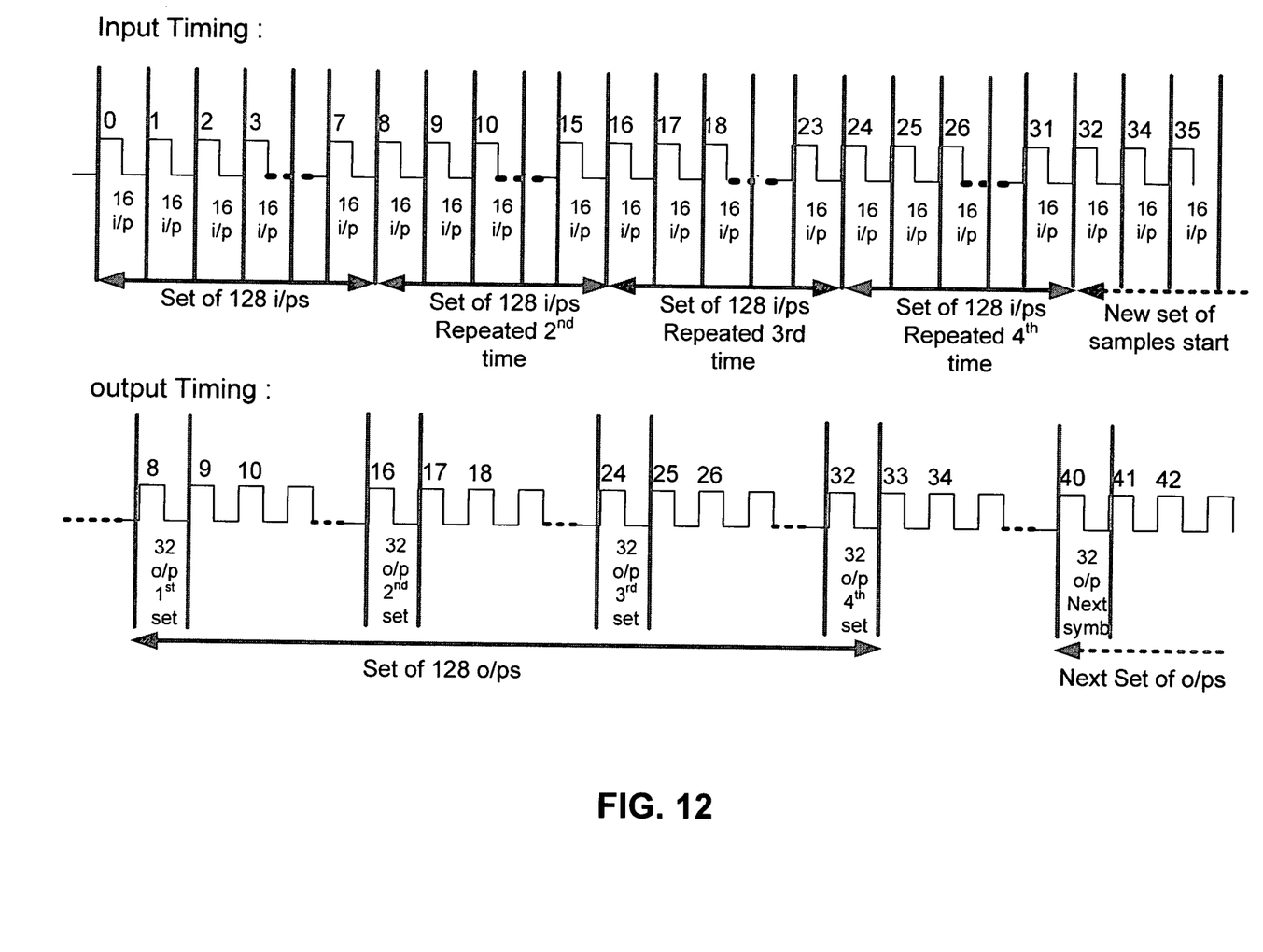
FIG. 12 illustrates the timing of a DFT/IDFT circuit in accordance with an embodiment of the present invention.

FIG. 12 illustrates the timing of a DFT/IDFT circuit in accordance with an embodiment of the present invention.

The input timing illustrates how the input values are received by input circuit 202. Note that input circuit 202 receives the 128 input values four times over 32 clock cycles using 16 parallel input lines. The output timing illustrates how the output values are generated by the accumulator circuit 208. Note that the DFT/IDFT circuit generates the 128 output values in four sets, wherein each set contains 32 output values.

Embodiments of the present invention can be used to perform DFT/IDFT computation in burst mode as well as continuous mode. A ping-pong memory of depth 128 can be used at both the input and output interfaces of the DFT/IDFT circuit. A ping-pong memory is typically used in conventional FFT implementations.

In both burst mode as well as continuous mode, the resets need to be cleared. Specifically, in burst mode the clearing can be performed whenever the next set of inputs are processed. In continuous mode, the clearing can be performed at periodic intervals. Appropriate reset logic architecture can be created so that resets to all pipeline stages are just in time.

Figure 13:
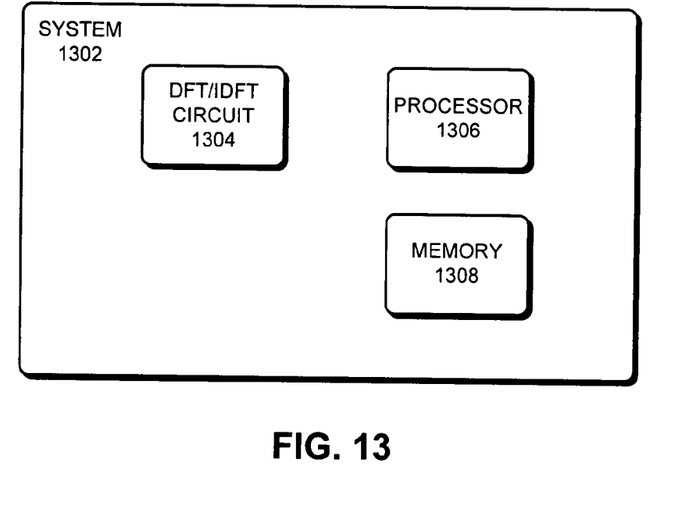
FIG. 13 illustrates a system that includes a DFT/IDFT circuit in accordance with an embodiment of the present invention.

FIG. 13 illustrates a system that includes a DFT/IDFT circuit in accordance with an embodiment of the present invention.

System 1302 can include DFT/IDFT circuit 1304. System 1302 can also include processor 1306 and memory 1308. The components within system 1302 can communicate with one another using a bus or a switch or any other communication mechanism. DFT/IDFT circuit 1304 and/or system 1302 can be used in a wide range of applications, including, but not limited to, signal processing, image processing, video processing, spectral analysis, and data communication.

Generalized Equations

The foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art.

Specifically, the following set of expressions can be used to design a DFT/IDFT circuit that uses a given number of CORDICs and that operates on a given number of inputs.

Let the number of points (i.e., the number of inputs or outputs) in the DFT/IDFT be $2^N$. Further, let the number of clock cycles required for computing the DFT/IDFT be $2^M$, where M<N (assuming the ideal case of no pipeline requirement). Hence, in $2^M$ cycles, $2^N$ points need to be calculated, each requiring $2^N$ inputs. Further, let the number of CORDICs be equal to $2^P$, where P<M.

Consider two scenarios. In the first scenario, the output circuit should not contain any degenerate rotors that are associated with an angle that is less than $\pi/2^S$. In this scenario, we can have $2^{P+S+1}$ parallel outputs. Let us assume that we have a degree of parallelism of $2^K$ at the input side. Hence, all $2^N$ input values can be fed into the DFT/IDFT circuit every $2^{N-K}$ clock cycles, and $2^J=2^{P+S+1}$ values can be output in parallel. Assuming that we do not require any processing margin (i.e., the ideal case of no pipelining), the following relation holds:

$$2^{N-K}\frac{2^N}{2^{P+S+1}} = 2^M \Rightarrow K = 2N - M - P - S - 1. \quad (13)$$

Note that the above expression bounds the degree of input parallelism in terms of the output constraints. In one embodiment, the DFT/IDFT circuit can input $2^K$ values in each clock cycle that are selected with uniform spacing from the total $2^N$ inputs. In other words, in the $a^{th}$ clock cycle, the input circuit can receive the values $\{x(a+2^{N-K}b), 0\leq a<2^{N-K}, 0\leq b<2^K\}$ as inputs.

The second scenario occurs when the input circuit should not contain any degenerate rotors that are associated with an angle that is less than $\pi/2^S$. In this scenario, all $2^N$ inputs can be fed into the DFT/IDFT circuit every $2^{N-S-1}$ clock cycles, and $2^J$ values can be output in parallel. Assuming that we do not require any processing margin (i.e., the ideal case of no pipelining), the following relation holds:

$$2^{N-S-1}\frac{2^N}{2^J} = 2^M \Rightarrow J = 2N - M - S - 1. \quad (14)$$

The above expression bounds the degree of output parallelism in terms of the input constraints. Note that it may not be possible to fulfill both constraints simultaneously for a given M.

A generalized version of equations (3)-(6) is as follows. We compute $\{x'(a,k+2^{K-P}b), 0\leq a<2^{N-K}, 0\leq b<2^P, 0\leq k<2^{N-J}\}$ by iteratively expanding the expressions as follows:

$$x'(a, k+2^{K-P}b) = \sum_{n=0}^{2^{K-P}-1} \begin{pmatrix} (x(2^{N-K}n+a)+x(2^{N-K}n+a+2^{N-1})e^{j\pi(k+2^{K-P}b)}) \\ (x(2^{N-K}n+a+2^{N-2})+ \\ x(2^{N-K}n+a+3\times 2^{N-2})e^{j\pi(k+2^{K-P}b)})e^{j\frac{\pi}{2}(k+2^{K-P}b)} \end{pmatrix} e^{j\frac{\pi n(k+2^{K-P}b)}{2^{N-K}}}$$

$$= \sum_{n=0}^{2^{K-P}-1} \begin{pmatrix} \begin{pmatrix} (x(2^{N-K}n+a)+x(2^{N-K}n+a+2^{N-1})e^{j\pi(k+2^{K-P}b)})+ \\ (x(2^{N-K}n+a+2^{N-2})+ \\ x(2^{N-K}n+a+3\times 2^{N-2})e^{j\pi(k+2^{K-P}b)})e^{j\frac{\pi}{2}(k+2^{K-P}b)} \end{pmatrix} \\ \begin{pmatrix} (x(2^{N-K}n+a+2^{N-3})+x(2^{N-K}n+a+5\times 2^{N-3})e^{j\pi(k+2^{K-P}b)})+ \\ (x(2^{N-K}n+a+3*2^{N-3})+ \\ x(2^{N-K}n+a+7\times 2^{N-3})e^{j\pi(k+2^{K-P}b)})e^{j\frac{\pi}{2}(k+2^{K-P}b)} \end{pmatrix} e^{j\frac{\pi}{4}(k+2^{K-P}b)} \end{pmatrix} + \end{pmatrix} e^{j\frac{\pi n(k+2^{K-P}b)}{2^{N-K}}}$$

$$\vdots \quad \vdots \quad \vdots$$

A generalized version of equation (7) is as follows. The expressions for $\{y'(a,k+2^{K-P}b), 0\leq a<2^{N-K}, 0\leq b<2^P, 0\leq k<2^{N-P-S-1}\}$ values are given by:

$$y'(a, k+2^{K-P}b) = x'(a, k+2^{K-P}b)e^{j\frac{2\pi(k+2^{K-P}b)a}{2^N}}. \quad (15)$$

Assuming that the degree of output parallelism is $2^J$, where J>P, each CORDIC is responsible for $2^{J-P}$ equally spaced outputs. Hence, a generalized version of equations (8)-(9) is given by the following expression:

$$Y(a, k+2^{K-P}b+t) = y'(a, k+2^{K-P}b)e^{j\frac{2\pi t 2^{N-J+P}}{2^N}} \quad (16)$$
$$= y'(a, k+2^{K-P}b)e^{j\frac{\pi t}{2^{J-P}}}$$

Finally, a generalized version of equation (10) is given by the following expression:

$$X(k+2^{K-P}b+t) = \sum_{a=0}^{2^{N-K}-1} Y'(a, k+2^{K-P}b+t) \quad (17)$$

It will be apparent to one skilled in the art that generalized equations (13)-(17) can be used to design a DFT/IDFT circuit based on a given set of constraints. The DFT/IDFT circuit shown in FIG. 2 is just one embodiment out of many possible embodiments of the present invention.

Furthermore, the present invention is not limited to embodiments in which the number of inputs is a power of 2. When the number of inputs is not equal to a power of 2, some terms may not be able to be grouped, and these leftover terms may need to be processed through the CORDICs separately. However, the basic design philosophy of the circuit is still valid, i.e., group terms in pairs separated by angles $\pi$, $\pi/2$, $\pi/4$, $\pi/8$, etc., pass them through the CORDICs, etc. Note that an interesting scenario arises when the number of data points is $2^k(2n+1)$. In this case, the input circuit can group some terms in threes instead of pairs, thereby avoiding leftover terms.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A circuit, comprising:
an input circuit to generate a first set of intermediate values in parallel by performing rotations and additions on a set of input values, wherein the input circuit includes a first set of degenerate rotators to perform said rotations, wherein each degenerate rotator in the first set of degenerate rotators performs a rotation by $\pi/2^r$, where r is an integer, and wherein the cardinality of the first set of intermediate values is less than the cardinality of the set of input values;
an intermediate circuit to generate a second set of intermediate values in parallel by rotating the first set of intermediate values using a set of CORDICs (coordinate rotation digital computers) configured to operate in parallel, wherein the cardinality of the set of CORDICs is equal to the cardinalities of the sets of first and second intermediate values;
an angle-generating circuit which generates a set of angle values in parallel, wherein each angle value in the set of angle values is provided as an input to a corresponding CORDIC in the set of CORDICs;
an output circuit to generate a third set of intermediate values in parallel by performing rotations on the second set of intermediate values, wherein the output circuit includes a second set of degenerate rotators, wherein each degenerate rotator in the second set of degenerate rotators performs a rotation by $\pi/2^r$, where r is an integer, and wherein the cardinality of the third set of intermediate values is greater than the cardinality of the second set of intermediate values; and
an accumulator circuit, comprising a set of accumulators configured to operate in parallel, to generate a set of output values based on the third set of intermediate values.

2. The circuit of claim 1, further comprising:
a first modulo circuit which generates a first modulo value, wherein the input circuit uses the first modulo value to generate the first set of intermediate values;
a second modulo circuit which generates a second modulo value, wherein the output circuit uses the second modulo value to generate the third set of intermediate values; and
a clearing circuit which generates a signal, wherein the accumulator circuit uses the signal to clear the set of accumulators.

3. The circuit of claim 1, wherein the set of input values and the set of output values are complex numbers.

4. The circuit of claim 1, wherein a degenerate rotator is one of:
a $\pi$ rotator;
a $\pi/2$ rotator;
a $\pi/4$ rotator; and
a $\pi/8$ rotator.

5. The circuit of claim 1, wherein the set of input values is a subset of a first set of input values, and wherein the set of output values is a subset of a first set of output values.

6. The circuit of claim 5, wherein the first set of output values is a discrete Fourier transform of the first set of input values.

7. The circuit of claim 5, wherein the first set of output values is an inverse discrete Fourier transform of the first set of input values.

8. A non-transitory computer-readable storage medium storing instructions for implementing a circuit, the circuit comprising:
an input circuit to generate a first set of intermediate values in parallel by performing rotations and additions on a set of input values, wherein the input circuit includes a first set of degenerate rotators to perform said rotations, wherein each degenerate rotator in the first set of degenerate rotators performs a rotation by $\pi/2^r$, where r is an integer, and wherein the cardinality of the first set of intermediate values is less than the cardinality of the set of input values;
an intermediate circuit to generate a second set of intermediate values in parallel by rotating the first set of intermediate values using a set of CORDICs (coordinate rotation digital computers) configured to operate in parallel, wherein the cardinality of the set of CORDICs is equal to the cardinalities of the sets of first and second intermediate values;
an angle-generating circuit which generates a set of angle values in parallel, wherein each angle value in the set of angle values is provided as an input to a corresponding CORDIC in the set of CORDICs;
an output circuit to generate a third set of intermediate values in parallel by performing rotations on the second set of intermediate values, wherein the output circuit includes a second set of degenerate rotators, wherein each degenerate rotator in the second set of degenerate rotators performs a rotation by $\pi/2^r$, where r is an integer, and wherein the cardinality of the third set of intermediate values is greater than the cardinality of the second set of intermediate values; and
an accumulator circuit, comprising a set of accumulators configured to operate in parallel, to generate a set of output values based on the third set of intermediate values.

9. The non-transitory computer-readable storage medium of claim 8, the circuit further comprising:
a first modulo circuit which generates a first modulo value, wherein the input circuit uses the first modulo value to generate the first set of intermediate values;
a second modulo circuit which generates a second modulo value, wherein the output circuit uses the second modulo value to generate the third set of intermediate values; and
a clearing circuit which generates a signal, wherein the accumulator circuit uses the signal to clear the set of accumulators.

10. The non-transitory computer-readable storage medium of claim 8, wherein the set of input values and the set of output values are complex numbers.

11. The non-transitory computer-readable storage medium of claim 8, wherein a degenerate rotator is one of:
a $\pi$ rotator;
a $\pi/2$ rotator;
a $\pi/4$ rotator; and
a $\pi/8$ rotator.

12. The non-transitory computer-readable storage medium of claim 8, wherein the set of input values is a subset of a first set of input values, and wherein the set of output values is a subset of a first set of output values.

13. The non-transitory computer-readable storage medium of claim 12, wherein the first set of output values is a discrete Fourier transform of the first set of input values.

14. The non-transitory computer-readable storage medium of claim 12, wherein the first set of output values is an inverse discrete Fourier transform of the first set of input values.

15. A system, comprising:
a processor;
a memory; and
a circuit, which includes:
an input circuit to generate a first set of intermediate values in parallel by performing rotations and additions on a set of input values, wherein the input circuit includes a first set of degenerate rotators to perform said rotations, wherein each degenerate rotator in the first set of degenerate rotators performs a rotation by $\pi/2^r$, where r is an integer, and wherein the cardinality of the first set of intermediate values is less than the cardinality of the set of input values;
an intermediate circuit to generate a second set of intermediate values in parallel by rotating the first set of intermediate values using a set of CORDICs (coordinate rotation digital computers) configured to operate in parallel, wherein the cardinality of the set of CORDICs is equal to the cardinalities of the sets of first and second intermediate values;
an angle-generating circuit which generates a set of angle values in parallel, wherein each angle value in the set of angle values is provided as an input to a corresponding CORDIC in the set of CORDICs;
an output circuit to generate a third set of intermediate values in parallel by performing rotations on the second set of intermediate values, wherein the output circuit includes a second set of degenerate rotators, wherein each degenerate rotator in the second set of degenerate rotators performs a rotation by $\pi/2^r$, where r is an integer, and wherein the cardinality of the third set of intermediate values is greater than the cardinality of the second set of intermediate values; and
an accumulator circuit, comprising a set of accumulators configured to operate in parallel, to generate a set of output values based on the third set of intermediate values.

16. The system of claim 15, the circuit further comprising:
a first modulo circuit which generates a first modulo value, wherein the input circuit uses the first modulo value to generate the first set of intermediate values;
a second modulo circuit which generates a second modulo value, wherein the output circuit uses the second modulo value to generate the third set of intermediate values; and
a clearing circuit which generates a signal, wherein the accumulator circuit uses the signal to clear the set of accumulators.

17. The system of claim 15, wherein a degenerate rotator is one of:
a $\pi$ rotator;
a $\pi/2$ rotator;
a $\pi/4$ rotator; and
a $\pi/8$ rotator.

18. The system of claim 15, wherein the set of input values and the set of output values are complex numbers, wherein the set of input values is a subset of a first set of input values, and wherein the set of output values is a subset of a first set of output values.

19. The system of claim 18, wherein the first set of output values is a discrete Fourier transform of the first set of input values.

20. The system of claim 18, wherein the first set of output values is an inverse discrete Fourier transform of the first set of input values.

* * * * *